Sept. 18, 1923.
J. F. LAMB
1,468,385
ELECTRICALLY HEATED UTENSIL
Filed June 11, 1919
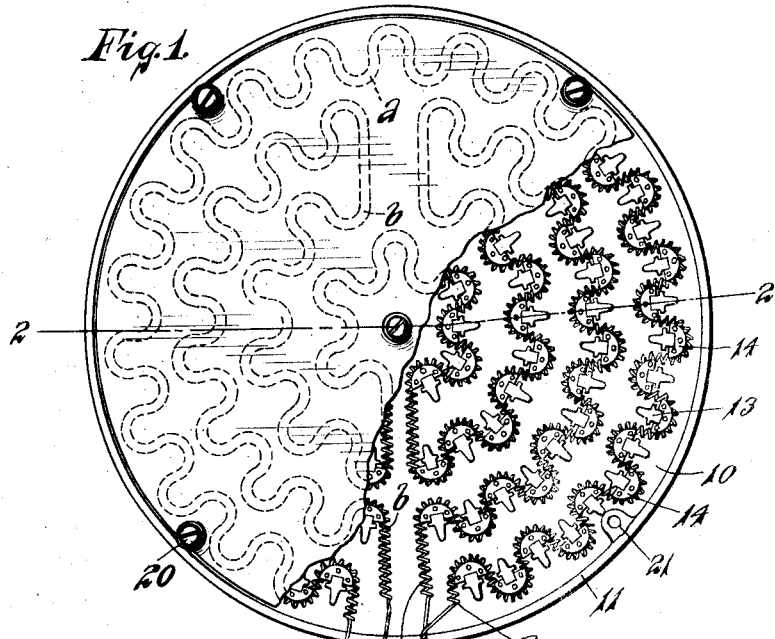
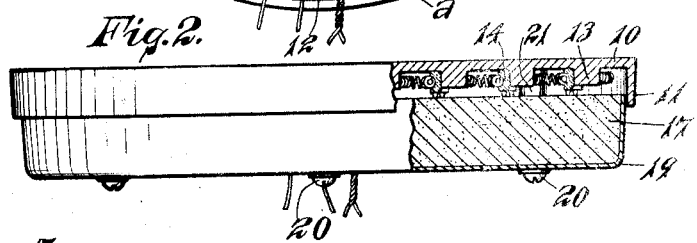
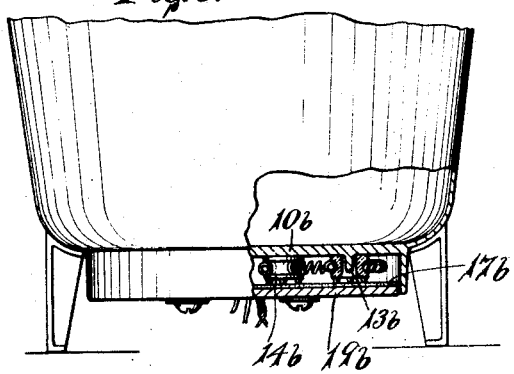
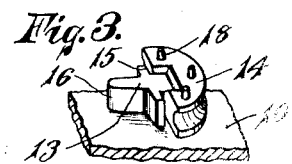
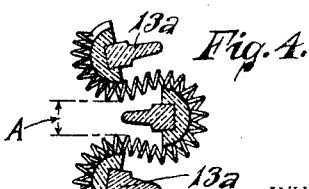
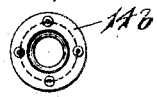
INVENTOR.
Joseph F. Lamb:
BY
ATTORNEY.

Patented Sept. 18, 1923.

1,468,385

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED UTENSIL.

Application filed June 11, 1919. Serial No. 303,518.

*To all whom it may concern:*

Be it known that I, JOSEPH F. LAMB, a citizen of the United States, and a resident of New Britain, in the county of Hartford, State of Connecticut, have invented certain new and useful Improvements in an Electrically-Heated Utensil, of which the following is a specification.

The object of this invention is to provide an electrically heated device having features of novelty which result in increased efficiency and simplicity in construction.

In the accompanying drawings, I have shown, in Figs. 1 and 2, my invention incorporated in a heater of the type having a hot plate adapted to receive the article or utensil to be heated and, in Fig. 5, my invention is applied to a kettle but it is to be understood that the invention has other uses than those shown, it being applicable for use in various kinds of electrically heated devices. The present disclosure is by way of illustration only and, therefore, it is not to be taken as restrictive of my conception.

In said drawings:—

Fig. 1 is a bottom plan view of a stove with a portion thereof broken away to show the heating elements.

Fig. 2 is a side view of the stove a portion being in section on line 2—2 of Fig. 1.

Fig. 3 is an enlarged detail view of one of the projections and insulators shown in Figs. 1 and 2.

Fig. 4 is a fragmentary view on an enlarged scale of a slightly different arrangement from that shown in the preceding figures.

Fig. 5 is a sectional view of the portion of a kettle to which my improvements are applied.

Fig. 6 is a plan view of one of the projections and insulators of Fig. 5.

My invention is applied to devices having a mass of metal to be heated provided with a surface from which the heat is taken by a substance or article contacting therewith and while this mass may have any one of a variety of forms and applications, I have shown the same in Figs. 1 and 2 as comprising a metallic hot plate of a stove and in Fig. 5 as comprising the bottom of a utensil such as a boiling kettle. For the purpose of convenience, I refer in the appended claims to the mass of metal to be heated as a hot plate and it is to be understood that I used this term in its broad sense.

The embodiments herein described are similar and, therefore, like reference numerals are employed to indicate like parts.

Depending from the metallic hot plate 10 of Figs. 1 and 2 is an annular flange or skirt 11 forming a chamber which receives the heating element or elements comprising, in the present illustrative disclosure, coiled wires 12 carried by electrical insulators 14 held in spaced apart relation by projections 13. The projections 13 are preferably cast integral with the plate so that the heat absorbed by these projections will be conducted directly to the hot plate without passing through an intervening medium securing the projections to the plate. The electrical insulators are made of a good heat conducting material and each has a substantial area in contact with its respective projection so that the heat will be quickly conducted away from the insulators by the projections and thus overheating of the insulators is prevented. While the projections or studs 13 and insulators may have any one of a great number of forms, preferably the insulators (also herein referred to as bushings) do not entirely surround or encircle the projections 13 thus providing an uncovered or bare portion on each projection so that a portion of the radiated heat is absorbed by the projections and conveyed thereby to the hot plate.

In that embodiment of my invention shown in Figs. 1 to 3, each bushing is semicylindrical and externally grooved and is provided with a rectangular notch which receives a similarly shaped portion of a projection 13. With this arrangement, the bushings cannot turn about their respective projections. Each projection may have lateral extensions forming shoulders 15 which are spaced slightly from the bushings. If desired a rib or fin 16 may extend outwardly from the uncovered portion of each projection so that the radiated heat may be more readily absorbed by the projections.

Preferably, the projections are of less length than the bushings receiving the same so that the body of heat insulating material 17 closing the bottom of the heater will engage the bushings without contacting with the projections 13 themselves. For the purpose of reducing the conduction of heat from the bushings to the heat insulating material 17, the bushings are provided with small protuberances 18 which have but point contacts with the material 17. By employing the protuberances 18 a space or passage is obtained between each insulator and the material 17 in which air may circulate, and radiation of the heat from the bottoms of the bushings is provided for so that the heat radiating area of the bushings is increased.

The distribution of the projections 13 may, of course, be varied. In the present instance, they are arranged in concentric circles with the projections of each circle in staggered relation and the resistance wires are looped under tension about the insulators in zig-zag fashion. With the construction shown in Figs. 1 and 2, in the event one of the insulators should crack into two or more parts, the parts will be held by the wire in the pockets or angles between the body portion of the projection and the lateral extensions 15 thereof so that proper insulation of the wire is maintained. The lateral extensions 15 also serve to absorb the radiated heat and convey the same to the hot plate.

In Fig. 4, the projections 13ª are not provided with the extensions 15 but the distance between adjacent bushings is less than the width of the intervening bushing so that the neck, as at A, of each loop of the resistors is narrower than the width of the bushings. With this arrangement, the resistors which are wound under tension about the external surfaces of the bushings, are retained securely in place and should one of the bushings crack or split vertically into one or more pieces the resistor will force the parts radially towards the projection and thus hold them against separation. It is, of course, obvious that if desired the projections 13ª of the embodiment shown in Fig. 4 may be provided with extensions similar to the extensions 15' shown in the preceding figures as a further insurance against separation of parts of an insulator, should such insulator break.

It will be seen that in Figs. 1 to 3 inclusive, the bushings 14 are held in position against the projections 13 by the resistance wires 12, and the resistance wires are supported by the bushings. Each of the projections are separate from the remaining projections, and each is provided with its own independent insulator with which it is in heat conductive relation. I refer to the insulators as being carried by the projections in the sense that they are in contact therewith so that they are held in spaced apart relation thereby and are in heat conductive relation thereto.

The arrangement of the wires 12 may be varied, the number of coils being increased to meet requirements. In the present instance I have illustrated two resistors—one $a$ being placed about the outer row or circle of bushings and the other $b$ being passed around the inner circles in succession toward the center of the hot plate. The object of providing one or more resistors is to produce a device in which the heat intensity may be varied, with the arrangement shown three heats being obtainable as will be readily understood by those familiar with the art.

In Figs. 5 and 6 the arrangement of the bushings and projections on the bottom 10ᵇ or "hot plate" of the kettle is similar to that shown in Figs. 1 and 2 except that the studs or projections 13ᵇ are round and the bushings 14ᵇ are cylindrical and axially apertured to receive the studs.

By preference, the body of insulating material 17 consists of cork brick which is an excellent heat non-conducting material and the body of this brick is of considerable thickness so as to insure that none of the heat will flow to the bottom of the heater and be dissipated. The brick may be encased in a metal shell 19 secured to the hot plate by means of any suitable securing devices, screws 20 being illustrated. These screws, which are received by threaded openings in bosses 21 preferably formed integral with the hot plate, constitute the only means which can conduct the heat downwardly, but being few in number and of relatively small mass, the dissipation of heat caused thereby is negligible.

In Fig. 5 instead of showing the body of cork brick, I have illustrated the chamber on the bottom of the kettle as being closed by a layer or body 17ᵇ of mineral wool or the like and a bottom plate 19ᵇ.

It will be seen from the foregoing description that the hot plate is heated by direct radiation of the heat from the bare resistors or wires 12 and by conduction of the heat through the bushings and the projections 13 with which said bushings are in contact. The bushings are in direct heat conductive relation to the hot plate in that there is a solid heat conducting medium or path for conducting the heat from the wires to the hot plate, in one instance, this path being through the bushings directly to the hot plate, and in another instance, through the bushings to the projections and then to the hot plate.

As heretofore stated, the wires do not pass through the bushings but engage the external surfaces thereof, the advantage of this arrangement being that a greater portion of the wires is exposed or bared so as to permit a greater amount of the heat generated to radiate to the hot plate and no energy or heat is wasted in bringing the bushings to an excessive heat intensity. In cases where the resistors pass through an opening in a bushing the heat is localized at the wall of this opening with the result that each bushing becomes a little furnace resulting in a strain of the wires and in many instances, particularly where there is an air pocket in the wall of the opening, the wire becomes burned out. In the present instance, the bushings are not raised to a temperature which will injure the bushings or the resistors for the heat generated, where the resistors contact with the bushings, is radiated to the air and that portion of the heat which is absorbed by the bushings is readily carried away by direct conduction to the hot plate and the projections carried thereby.

All of the heat generated by a device constructed in accordance with the present invention is conducted to the hot plate as the insulating material closing the bottom of the chamber in which the resistors are located prevents conduction of the heat to the bottom of the device. My improved structure is highly efficient as all of the heat generated is localized at the surface of the hot plate. The device is simple in construction and may be cheaply manufactured especially so as the hot plate and the lugs are cast integral, thus eliminating the necessity of machining the parts to obtain close fits.

The heating elements are enclosed in a substantially air tight chamber so that none of the air within the chamber can escape and dissipate the heat to the atmosphere and outside air cannot gain access to the chamber and cause oxidation of the resistor and a loss in efficiency. However, the air within this chamber may freely circulate throughout the entire extent thereof so that hotter air in one portion of the chamber may flow to cooler portions of the chamber and thus the heat will be uniformly distribute to the hot plate.

It is to be understood that the structure is susceptible of various modifications and changes which come within the invention as set forth in the appended claims, and the shape and arrangement of the several parts illustrated and described may be varied without departing from the spirit of the invention.

I claim as my invention:

1. In an electrically heated device, a hot plate, a plurality of refractory heat conducting electrical insulators in direct heat conductive relation therewith, spacing means therefor, and a bare resistor supported by the external surfaces of said insulators.

2. In an electrically heated device, a hot plate, spaced metallic projections depending therefrom and integral therewith, refractory heat conducting electrical insulators carried by said projections and in contact with said hot plate, and a bare resistor supported under tension by the external surfaces of said insulators.

3. In an electrically heated device, a hot plate, projections carried thereby, a refractory heat conducting electrical insulator associated with each projection and engaging against said hot plate, a resistance wire separably carried by the external surfaces of said insulators, and means for holding said insulators against said hot plate.

4. In an electrically heated device, a hot plate, spaced projections integral therewith, a separate refractory heat conducting electrical insulator for each projection, and a resistor separable from and supported by said insulators.

5. In an electrically heated device, a hot plate, spaced apart projections carried thereby, a single separate heat conducting electrical insulator about and engaging each projection, and a resistance wire supported by the external surfaces of said insulators.

6. In an electrically heated device, a hot plate, spaced apart studs integral with and depending from the bottom of said hot plate, a separate heat conducting electrical bushing carried by each stud, and a resistance wire supported by the external surfaces of said bushings.

7. In an electrically heated device, a hot plate, spaced apart studs depending from the bottom of said hot plate, externally grooved heat conducting electrical bushings one for each projection and having a notch receiving the same, each of said bushings having one end contacting with said hot plate, and a resistance coil supported under tension in the grooves of said bushings.

8. In an electrically heated device, a hot plate, a plurality of spaced apart projections carried thereby, a separate electrically insulator carried by each projection, leaving a side thereof uncovered, and a resistor supported by said insulators.

9. In an electrically heated device, a hot plate, metallic projections carried thereby, a parti-cylindrical electrical insulator on each projection, and a resistor carried by the external surfaces of said insulators.

10. In an electrically heated device, a hot plate, metallic projections carried thereby, a separate heat conducting electrical insulator positioned against one side of each projection, said insulators being arranged in staggered relation with adjacent insulators contacting with opposite sides of their respective projections, and a resistance coil supported under tension by the external faces of said insulators and maintaining said insulators in position against said projections.

11. In an electrically heated device, a hot plate, spaced apart projections integral with and depending from said hot plate, a separate externally grooved heat conducting electrical insulator for each projection and contacting at one end against the hot plate, each of said insulators having a notch in which the projections are positioned and adjacent insulators being positioned on opposite sides of the projections so that the grooved surfaces of the insulators are in staggered relation, and a resistance wire supported under tension in the grooves of said insulators.

12. In an electrically heated device, a hot plate, a plurality of spaced projections carried thereby, a heat conducting electrical insulator carried by each projection, a portion of each projection being uncovered, means on said uncovered portions for facilitating absorption of the radiated heat by said projections, and a resistor supported by said insulators.

13. In an electrically heated device, a hot plate, metallic projections carried thereby, a rib on each projection, a semi-cylindrical electrical insulator on each projection, and a resistor supported by said insulators.

14. In an electrically heated device, a hot plate, projections carried thereby, shoulders thereon, insulators associated with said projections adjacent to said shoulders, and a resistor supported by the external surfaces of said insulators.

15. In an electrically heated device, a hot plate, projections carried thereby and having lateral extensions, parti-cylindrical insulators arranged in staggered relation and each having a notch receiving a projection forwardly of said extensions, and a resistance wire supported under tension on said insulators.

16. In an electrically heated device, a hot plate forming a wall of an enclosed chamber, spaced projections thereon, a refractory electrical insulator associated with each projection and engaging said hot plate, a resistor supported by said insulators, and a closure for said chamber engaging said insulators and holding them against said hot plate.

17. In an electrically heated device, a hot plate forming the wall of a chamber, a plurality of spaced projections carried by said plate, electrical insulators carried by said projections, a resistor supported by said insulators, a closure for said chamber, and means between said insulators and closure for providing an air space therebetween.

18. In an electrically heated device, a hot plate forming the wall of a chamber, a plurality of spaced projections carried by said plate, parti-cylindrical electrical insulators carried by said projections, a resistor supported by said insulators and maintaining said insulators against lateral movement relative to said projections, and a closure for said chamber engaging the bottom ends of said insulators and thereby maintaining them against endwise movement relative to said projections.

19. In an electrically heated device, a hot plate forming the wall of a chamber, spaced apart metallic projections carried thereby, an electrical insulating bushing carried by each projection, a resistor carried by said bushings, and a layer of insulating material closing the bottom of said chamber and engaging the bottom ends of said bushings.

20. In an electrically heated device, a hot plate forming a wall of a chamber, a plurality of spaced apart electrical insulating bushings in said chamber and contacting at one end with said plate, spacing means therefor, a resistor supported by said bushings, a body of heat insulating material closing the bottom of said chamber and maintaining the bushings against movement on said spacing means, and means for providing an air space between said bushings and said body of heat insulating material.

21. In an electrically heated device, a hot plate forming a wall of a chamber, a plurality of spaced projections carried by said plate, electrical insulators carried by said projections and each having protuberances at one end, a resistor supported by said insulators, a body of heat insulating material contacting with said protuberances, and means for securing said body of heat insulating material in position.

22. In an electrically heated device, a hot plate provided with a chamber, spaced apart projections on said hot plate and located within said chamber, an electrical insulator for each projection and of greater length than the same and abutting at one end against said hot plate, a resistor carried by said insulators, and a body of insulating material closing the bottom of said chamber and engagaging the other ends of said insulators.

23. In an electrically heated device, a hot plate provided with a chamber, spaced apart projections integral with said hot plate and located within said chamber, an electrical insulator for each of said projections, a resistor supported by said bushings, a body of heat insulating material closing the bottom of the chamber and engaging the bottom ends of said insulators, a metal cover on said body of insulating material, and means for securing said parts together.

24. In an electrically heated device, a hot plate provided with a chamber, spaced apart metallic projections carried by said plate, an insulator for each projection, a resistor carried by said insulators, a body of heat insulating material closing the bottom of said chamber and engaging said insulator, a metallic cover over said body, and screws between said hot plate and cover for securing the parts together.

25. In an electrically heated device, a hot plate, a plurality of spaced apart heat conducting electrical insulators in heat conducting relation thereto, and a resistor, each of said insulators and the resistor constituting means for supporting the other in operative position.

26. In an electrically heated device, a hot plate, spacing means thereon, a plurality of spaced apart heat conducting electrical insulators unattached to and positioned against said spacing means, and a resistor separable from but supported in operative position by said insulators and supporting the insulators against said spacing means.

27. In an electrically heated device, a hot plate, projections carried thereby, a separate heat conducting electric insulator unattached to and positioned against one side of each of said projections, and a resistor supported by the external surfaces of said insulators and supporting the latter in operative position against said projections.

28. In an electrically heated device, a hot plate, a plurality of spaced apart projections carried thereby, a separate electrical insulator carried by and extending but partially about each projection, adjacent insulators being on opposite sides of their respective projections, and a resistor supported by the external surfaces of said insulators and maintaining said insulators against lateral movement relative to said projections.

29. In an electrically heated device, a hot plate, metallic projections carried thereby, a separate heat conducting electrical insulator positioned against one side of each projection, said insulators being arranged in staggered relation with adjacent insulators contacting with opposite sides of their respective projections, and a resistor supported by the external surfaces of said insulators and maintaining said insulators in position against said projections.

30. In an electrically heated device, a hot plate, spaced apart projections thereon, electrical insulators on each projection, cooperating parts on said projections and insulator to prevent relative rotary motion, and a resistor supported by the external surfaces of said insulators.

31. In an electrically heated device, a hot plate, spaced apart projections thereon, a separate electrical insulator carried by and extending but partially about each projection, cooperating parts on said projections and insulators to prevent relative rotary motion, and a resistor supported by said insulators and maintaining said insulators against lateral movement relative to said projections.

32. In an electrically heated device, a hot plate, spaced apart metallic projections thereon, a heat conducting electrical insulator engaging each projection, the engaging surfaces of said projections and insulators being non-circular whereby insulators are prevented from turning about their respective projections, and a resistor supported by the external surfaces of said insulators.

33. In an electrically heated device, a hot plate, a plurality of spaced apart studs having a squared portion, heat conducting electrical insulators one for each projection and each having a square notch receiving the square portion thereof, and a resistor supported by said insulators.

34. In an electrically heated device, a hot plate, spaced apart projections thereon, an electrical insulator associated with each projection, and a resistor wrapped about a portion of the circumference of said insulators and constituting means for holding in position parts of the resistor supporting portion of each insulator in case of breakage.

35. In an electrically heated device, a hot plate, spaced apart projections thereon, an electrical insulator carried by and extending but partially about each projection, said insulators being arranged in staggered relation with adjacent insulators contacting with opposite sides of their respective projections, and means for maintaining against displacement parts of each resistor in the event the same should break.

36. In an electrically heated device, a hot plate, spaced apart projections thereon, an electrical insulator associated with each projection, and a resistor separated from but supported on said insulators and arranged to maintain the parts thereof against said projection in the event said insulators should break.

37. In an electrically heated device, a hot plate, spaced apart projections thereon each provided with pockets, an electrical insulator associated with each projection, and a resistor supported by the external surfaces of said insulators and arranged to maintain the parts of said insulators in said pockets should the same break.

38. In an electrically heated device a hot plate, spaced apart projections thereon, an electrical insulator associated with each projection, said insulators being arranged in staggered relation and the distance between alternate insulators being less than the width of the intervening insulators, and a resistor supported by and passing about the external surfaces of adjacent insulators in opposite directions.

39. In an electrically heated device, a hot plate, a series of projections thereon, a resistor provided with a series of reverse loops each of which in part surrounds a projection, and an electrical insulator interposed between said resistor and projections and constituting a support for the former.

40. In an electrically heated device, a hot plate, a series of projections thereon, a resilient resistor provided with reverse loops each of which in part surrounds a projection, and an electrical insulator interposed between said resistor and projections and constituting a support for the former.

41. In an electrically heated device, a hot plate, projections carried thereon, electrical insulators positioned against opposite sides of adjacent projections, and a coiled resilient resistor supported in serpentine form on succeeding bushings and constituting means for holding said bushings in position on said projections.

42. In an electrically heated device, a hot plate, projections carried thereon, a coiled resilient resistor extended in reverse loops about succeeding projections, and an electrical insulator interposed between one side of each of said projections and resistor and constituting a support for the latter.

JOSEPH F. LAMB.

Witnesses:
HEMAN C. MAGARGAL,
CATHERINE SCANLON.